United States Patent
Quinn

(10) Patent No.: US 8,515,429 B2
(45) Date of Patent: Aug. 20, 2013

(54) METHOD, WIRELESS TELECOMMUNICATIONS NETWORK AND NODE FOR PRE-ADJUSTING TRANSMISSION PARAMETERS OF RADIO BASE STATION IN ADVANCE OF ARRIVAL OF GROUPS OF MOBILE STATIONS

(75) Inventor: Karl Quinn, Dublin (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/054,714

(22) PCT Filed: Jul. 18, 2008

(86) PCT No.: PCT/EP2008/059437
§ 371 (c)(1),
(2), (4) Date: Apr. 4, 2011

(87) PCT Pub. No.: WO2010/006653
PCT Pub. Date: Jan. 21, 2010

(65) Prior Publication Data
US 2011/0183686 A1    Jul. 28, 2011

(51) Int. Cl.
*H04W 36/00* (2009.01)
(52) U.S. Cl.
USPC ........... 455/441; 455/509; 455/453; 455/450; 455/451; 455/452.1; 455/452.2; 370/231; 370/437; 370/443; 370/436

(58) Field of Classification Search
USPC .............. 455/509, 441, 453, 450, 451, 452.1, 455/452.2; 370/231, 437, 443, 436
See application file for complete search history.

(56) References Cited

U.S. PATENT DOCUMENTS

| | | | |
|---|---|---|---|
| 6,385,454 B1 * | 5/2002 | Bahl et al. | 455/450 |
| 7,002,489 B1 | 2/2006 | Denker et al. | |
| 2003/0224799 A1 * | 12/2003 | Squibbs et al. | 455/450 |
| 2004/0017310 A1 | 1/2004 | Vargas-Hurlston | |
| 2004/0203832 A1 * | 10/2004 | An | 455/453 |
| 2004/0203857 A1 * | 10/2004 | Wang | 455/456.1 |
| 2006/0084445 A1 | 4/2006 | Minami et al. | |

FOREIGN PATENT DOCUMENTS

| | | |
|---|---|---|
| EP | 1 429 576 | 6/2004 |
| GB | 2 389 015 | 11/2003 |
| WO | 2007/061734 A2 | 5/2007 |

OTHER PUBLICATIONS

International Search Report for PCT/EP2008/059437, mailed Apr. 20, 2009.

* cited by examiner

Primary Examiner — Kwasi Karikari
(74) Attorney, Agent, or Firm — Nixon & Vanderhye, P.C.

(57) ABSTRACT

A method of controlling operation of a wireless telecommunications network is disclosed. The method uses location information as part of a dead reckoning algorithm to determine the general direction and average speeds of either an individual mobile station or herd of mobile stations at varying levels of abstraction. This information is then used to provision the telecommunications network in advance of a herd's arrival at a particular destination.

17 Claims, 6 Drawing Sheets

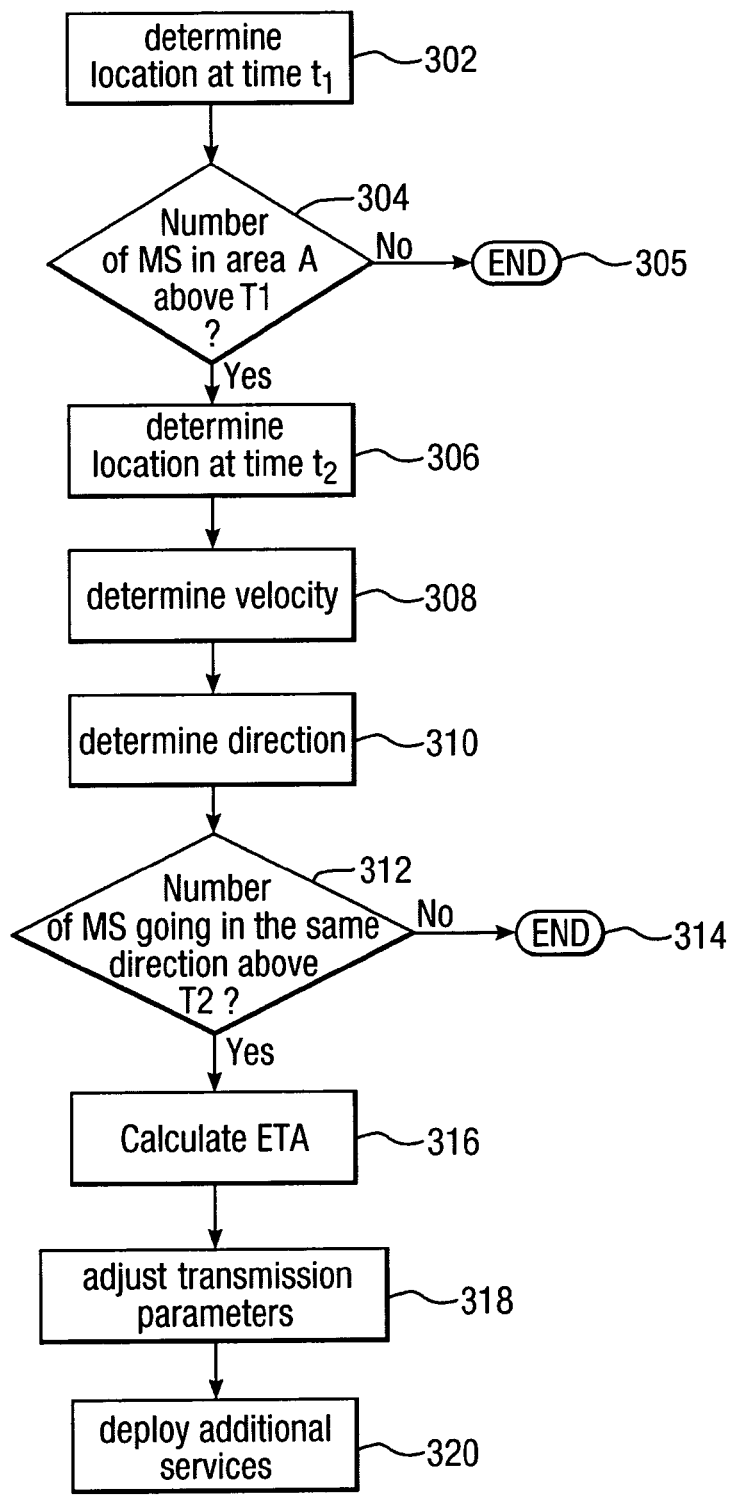

METHOD, WIRELESS TELECOMMUNICATIONS NETWORK AND NODE FOR PRE-ADJUSTING TRANSMISSION PARAMETERS OF RADIO BASE STATION IN ADVANCE OF ARRIVAL OF GROUPS OF MOBILE STATIONS

This application is the U.S. national phase of International Application No. PCT/EP2008/059437, filed 18 Jul. 2008, which designated the U.S., the entire contents of which is hereby incorporated by reference.

TECHNICAL FIELD

The technology disclosed herein relates to wireless telecommunications networks, in general, and in particular to controlling a telecommunications network based on changing density of mobile stations.

BACKGROUND

Infrastructure of a wireless telecommunications network is deployed in the field in a way to handle traffic that is expected to be a typical to a given geographical area. The number of calls and volume of data transmission handled in a busy city centre is much higher than the number of calls and volume of data transmitted in a quiet rural area. In order to cope with these different demands different network resources are deployed in different areas in order to achieve optimal service coverage. A network designed in this way will better handle traffic that can be described as average in this particular area. The network will also better handle traffic that exceeds this average traffic. If, however, the traffic experienced by the network infrastructure temporarily exceeds significantly this average value the network starts dropping calls and data is lost due to congestion.

A sudden increase in the number of phone calls and data transmission is, or can be, a result of gathering of large number of people with their mobile phones and other devices using the wireless telecommunications network. This may be a result of a football match when thousands of football fans are gathered in a football stadium that is empty for most of the week; it can also be a music festival or any other type of event where thousands of people are suddenly gathered in a place that is normally empty. In a solution known in the art, in order to cope with an expected increased traffic a network operator increases capacity of the network in the area of the event by deploying additional radio resources (e.g. additional radio base stations (RBS)) for the time of the event.

The disadvantage of this approach, however, is that it requires prior knowledge of the event, in order to plan the change of transmission parameters in the affected area. Another disadvantage is that the changes are based on an estimated number of mobile stations that will have to be additionally served and this may lead to a situation whereby not enough resources are allocated in order to accommodate the traffic, or more resources are allocated than needed. Both situations are not desired as in the former the user experience will not be good due to congestion and in the latter some resources will be wasted.

SUMMARY

Accordingly, the technology disclosed herein seeks to preferably mitigate, alleviate or eliminate one or more of the disadvantages mentioned above singly or in any combination.

According to a first aspect of the technology disclosed herein there is provided a method of controlling operation of a wireless telecommunications network comprising a first plurality of radio base stations serving a second plurality of mobile stations. In this method location velocity and direction of travel of said mobile stations is determined. In the next step it is calculated when the mobile stations enter a cell served by a new radio base station. Once it is known when the mobile stations will enter area covered by cell served by another radio base station transmission parameters of said new radio base station are adjusted to accommodate the network traffic caused by said arriving mobile stations.

According to a second aspect of the technology disclosed herein there is provided a wireless telecommunications network comprising a first plurality of radio base stations serving a second plurality of mobile stations, at least one radio network controller and at least one network management system node. Said radio network controller is connected to the radio base stations. The network management system node is adapted to determine position, velocity and direction of travel of said mobile stations. The network management system node is further adapted to calculate time when the mobile stations enter a cell served by a new radio base station and to provide this information to the radio network controller, which is adapted to adjust transmission parameters of said new radio base station in order to accommodate the additional traffic.

According to a third aspect of the technology disclosed herein there is provided a network management system node for a wireless telecommunications network. The network management system node comprises an interface for connecting to radio base stations of the wireless telecommunications network and to a radio network controller. The network management system node also comprises a processor unit which is adapted to determine position, velocity and direction of travel of mobile stations served by said radio base stations. Said processor unit is further adapted to calculate time when the mobile stations enter a cell served by a new radio base station, wherein said network management system node is adapted to provide this information to the radio network controller and/or to the new radio base station.

The advantages of the technology disclosed herein include advanced knowledge about mass movements of mobile stations in a telecoms network, which is in itself a commodity that is useful to the internal management of the network. In addition, such knowledge is useful to a range of external enterprises (e.g. road traffic control, petrol stations, food areas, etc.). Another advantage is that the telecommunications network can be intelligently managed based on the movements of these large herds. This intelligent management allows for reduction of power consumption compared to the known solutions, because it is known when the herd (group of mobile stations) will arrive and there is no need to adjust the parameters too early. The solution also allows for adapting the telecommunications network cell structure using cell breathing techniques, which provides increased flexibility. Additionally it allows a range of other services to be dynamically attached to a location based on the movements of these large herds, e.g. IPTV content can be cached in local cells in advance of a herd arrival.

BRIEF DESCRIPTION OF THE DRAWINGS

The technology disclosed herein will be understood and appreciated more fully from the following detailed description taken in conjunction with the drawings in which:

FIG. 3b is a diagram illustrating a method of controlling operation of a wireless telecommunications network in one embodiment of the technology disclosed herein;

DETAILED DESCRIPTION

Figure 1:
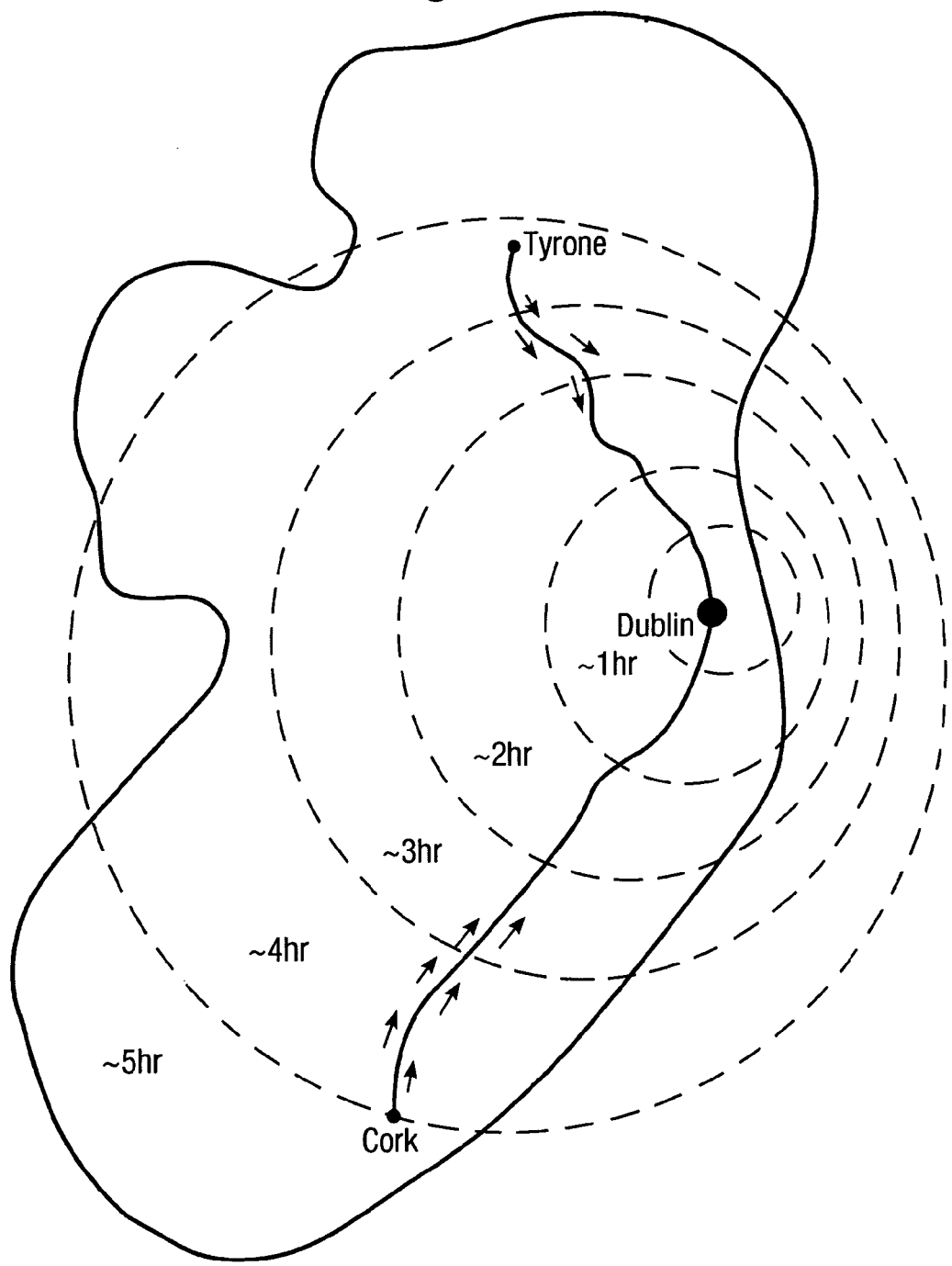
FIG. 1 and FIG. 2 illustrate simplified maps of a geographic area where a wireless telecommunications network operates in accordance with one embodiment of the technology disclosed herein.

Dead reckoning is a process of estimating current position based on a previously known position if the speed, elapsed time, and course are also known. Therefore, it is possible to use this speed, time, and course information to calculate a future position from a current (or previous) position. Provisioning a telecommunications network in order for it to work as intended involves controlling a wide range of resources, services, and activities. Therefore, provisioning can include the management of power consumption, cell breathing, and service configuration. Some of these activities are relatively static, for example deploying cell masts. However, other activities are more dynamic and allow the network to be tweaked in order to provide greater capacity or save energy. The number of cells that serves an area depends on the density of population of mobile stations in that specific area. If the number of mobile stations increases the range of geographical area covered by a cell (or cells) decreases (the cell shrinks). This phenomenon is called cell breathing. In essence, more users require more capacity.

Network management systems in 3G networks enable the service providers to identify the location of their subscribers. This information can be referred to as location information or mobility information. Currently, however, there is no mechanism that allows a network operator to determine in advance if a large group of mobile stations is moving towards (or from) a specific or general location. Therefore, a large set of people with mobile stations all travelling in the same general direction at the same time (also referred herein as a herd) can arrive at a location without any prior knowledge and have significant negative impact on the cell affecting the ability to use the network at that location. Developing a mechanism to transform the location information of the individual user into knowledge about the projected movements of a herd of users can be used to provision the network in advance of the herd's arrival at a particular area.

The technology disclosed herein proposes a mechanism for provisioning a telecommunications network in advance by utilising location information, an abstraction mechanism, and a dead reckoning system for determining the movements of mass herds within that telecommunications network. The basic concept of this technology disclosed herein is that anonymous location information will be used as part of a dead reckoning algorithm to determine the general direction and average speeds of either an individual mobile station or herd, or herds of users using mobile stations. This information will then be used to provision the telecommunications network in advance of a herd arrival at a particular destination.

A scenario where 80,000 football fans are moving towards Dublin, Ireland for a football final will be discussed below. For simplicity assume that groups of fans travel from Cork and Tyrone and that the majority of supporters are travelling towards Dublin by car/bus/train, which should take approximately 3-4 hours.

For the sake of clarity and simplicity the drawings in this application present the technology disclosed herein in a schematic way with elements and lines not essential for understanding the technology disclosed herein omitted. FIG. 1 shows these journeys in a simplified map of Ireland. The arrows show the sets of supporters travelling en masse from their start locations (Cork and Tyrone) to their destination (Dublin). Each of these two sets of supporters would constitute a herd of people, and within these two herds there would be many smaller herds. If the average speeds of the general mass herd (or smaller herds) are known then it becomes possible to calculate an Estimated Time of Arrival (ETA) to a location a fixed distance away.

The technology disclosed herein uses the location information available in a 3G and/or LTE (Long Term Evolution) telecommunications network to derive the necessary speed for the herds. The technical and theoretical aspects of the method of determining location of a mobile station are not subject matter of the technology disclosed herein. It is assumed that this information is known to the network as it is required for example for E911 service (service that allows locating those making emergency calls). These methods may include GPS techniques or multilateration and are well known in the art. At a very high level of granularity the provisioning of the telecommunications network may be specific to certain towns and cities, which are likely to experience heavier traffic loads as the mass herds travel through. Therefore, the power levels may be regulated to provide adequate coverage and capacity as the herd arrives and moves through, which may also result in an intelligent drop in power as the overall herd is expected to leave.

Figure 2:
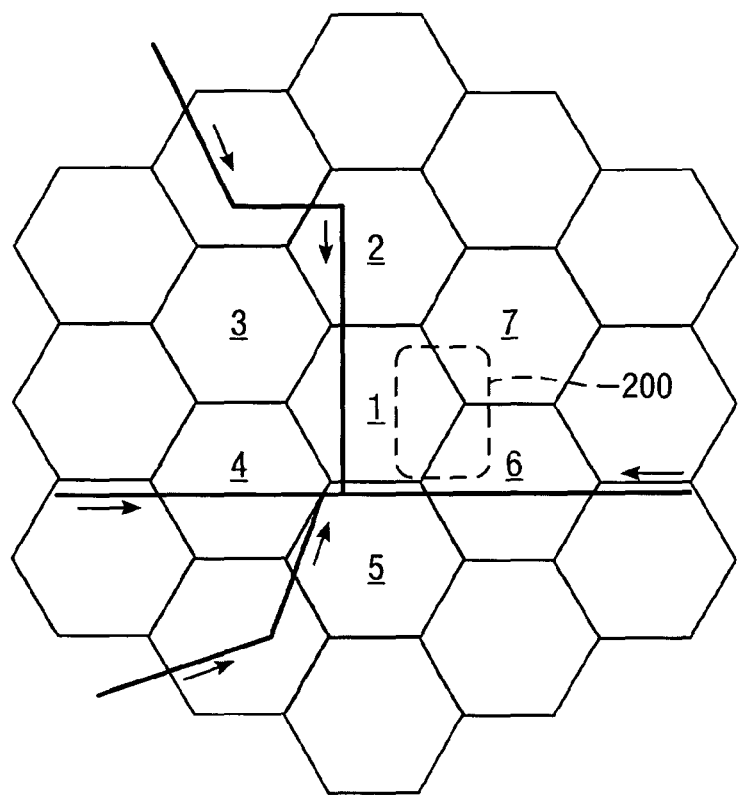

FIG. 2 illustrates a very fine grained view of a sub-section of Dublin city showing in very simplified way only the main streets in the vicinity of the football stadium with the classic hexagon based telecommunications network overlaid. The football stadium 200 is marked with a dashed line. Once again the general direction, mass, speed, and ETA can be derived from location based information. However, as the final destination becomes apparent it can be seen that very specific cells in the network (cells 1-7 around the stadium 200) can be provisioned in advance of the herds' arrival. This may include service configuration (e.g. advanced provision for IPTV—Internet Protocol Television), power regulation, cell breathing, and so on for very specific sets of cells. The technology disclosed herein combines the use of location information in a telecoms network with a set of abstraction layers and dead reckoning to provide a novel approach that allows network operators to approximate where mass herds will be at a future point in time.

Figure 3A:
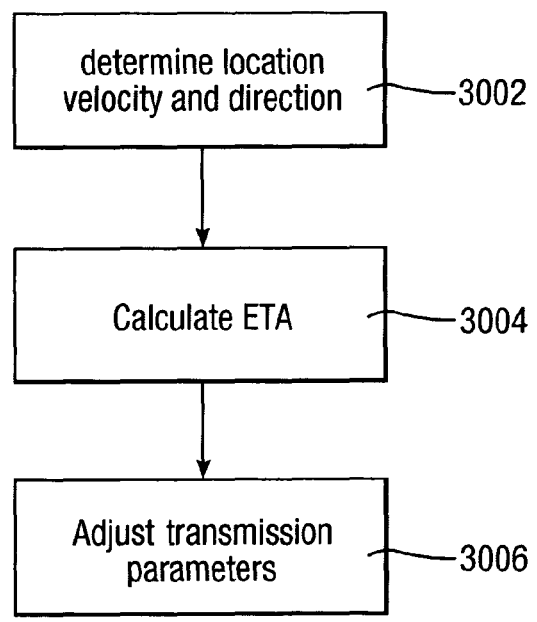
FIG. 3a is a diagram illustrating a method of controlling operation of a wireless telecommunications network in one embodiment of the technology disclosed herein.

FIG. 3a illustrates one embodiment of the method of the technology disclosed herein. In step 3002 location, velocity and direction of individual MS are determined. As explained above the location information is available in 3G and LTE networks. By knowing location of individual MS at two points in time it is possible to determine its velocity (distance covered between these two locations divided by time elapsed between these two points in time). It is also possible to determine the direction of travel, which is the vector between these two locations. With this information it is possible to estimate the time when the MS arrive at a particular location, which is performed in step 3004. Once the ETA is calculated the transmission parameters of the network in cell or cells the MS will cross en route to its destination (and this is determined based on its direction of travel) are adjusted ahead of the MS arrival.

A preferred embodiment of the technology disclosed herein illustrated in FIG. 3b provides additional advantageous features. In the first step location of individual mobile stations is determined 302 at time $t_1$. In one embodiment location of all MS is determined, however, in alternative embodiments only defined percentage of MS have their location determined by the network. In the next step it is checked if there are any groups or herds of MS. This is performed by checking the number of MS in a predefined area A. If the number of MS in area A exceeds a predefined threshold T1 304 then it is classified a herd and is further examined (or tracked). If, however, the group is too small or if it is only an individual MS the group or individual MS is not tracked 305. This prevents wasting processing resources on tracking groups too small to have negative impact on a cell when travelling between locations In the next step, 306, location of the MS in the larger groups is determined once again at time $t_2$. As explained previously, having knowledge about location of a MS at two points in time it is possible to determine velocity, 308, and direction of travel, 310, of the MS.

Figure 4:
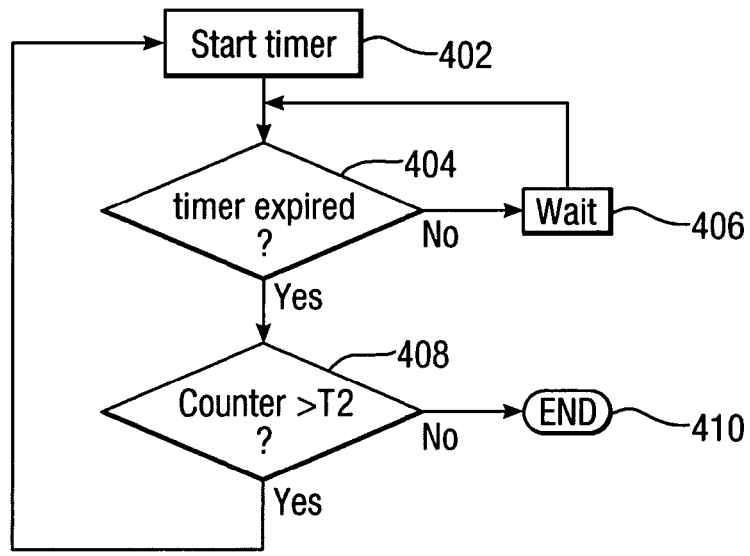
FIG. 4 is a diagram illustrating a preferred embodiment of the method of the technology disclosed herein.

The group of MS initially identified in step 304 for tracking as exceeding the first threshold T1 may be just a random collection of MS going in different directions. If this is the case the MS from such a group will not have a negative impact on a cell or cells of the network as they will not arrive at the same location at substantially the same time. In order to eliminate such groups another check is carried out in step 312. In step 312 it is checked if the number of MS travelling in substantially the same direction exceeds a second threshold T2. If the number is below T2 the tracking of this group ceases. A herd of MS is a dynamic object and in many situations the herds are formed randomly, e.g. a traffic jam on otherwise not so busy road, and then they disappear as the root cause for forming the herd disappears, e.g. the traffic jam is cleared and everyone goes in his/her own direction. Step 312 is designed to identify these randomly created herds and to stop using processing resources for tracking them. Therefore, for a herd where the number of MS travelling in the same direction is below the second threshold T2 the process is stopped 314. If, however, the number exceeds the second threshold T2 the estimated time of arrival is calculated 316. Then the transmission parameters in the cell or cells served by a new base station (or base stations) are adjusted to accommodate this additional traffic 318 caused by said arriving mobile stations. There may be situations that the cell capacity does not require any adjustment, so a check if the cell can accommodate this additional MS at current setting is performed (not shown in the drawing). In a preferred embodiment the method comprises maintaining a counter (as illustrated in FIG. 4) showing the number of MS travelling in substantially the same direction (herd population). The counter value is periodically monitored using a timer 402-406 and if it drops below said second threshold 408 the tracking of this herd is stopped 410.

The value of the first and second thresholds in one embodiment is equal, however in alternative embodiments these could be different values to avoid decisions taken based on random fluctuations of the herd's population.

If the scenario with football fans travelling to Dublin is considered, it may be that at large distances from the venue there is no need for any adjustments, but closer to the stadium the arriving herds definitely will have negative effect on the network performance and to minimise their impact the transmission parameters are adjusted ahead of their arrival 318.

Optionally, new services can be added to the network in the affected area. This may include local caching of IPTV content, providing information specific to the area (e.g. traffic information) or the event (e.g. where to park cars), etc.

Figure 5:
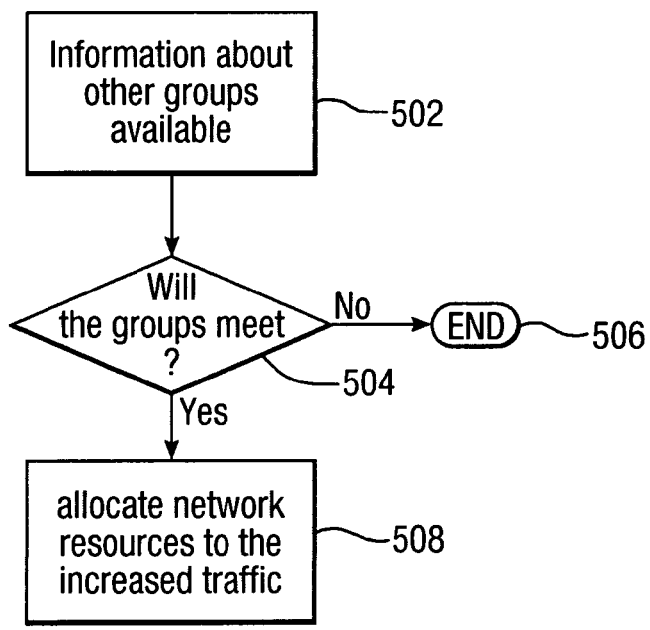
FIG. 5 is a diagram illustrating another preferred embodiment of the method of the technology disclosed herein.

In the scenario described earlier the herds travel from at least two directions (north and south) and closer they are to their destination point the easier for the network management to determine if these herds travelling from two directions will meet. Meeting in the context of this technology disclosed herein means that the herds will affect the network in substantially the same area (e.g. the vicinity of the football stadium). Therefore in a preferred embodiment, illustrated in FIG. 5, the method comprises combining information about the mobile stations travelling in substantially the same direction with information about other groups 502 of mobile stations in order to determine if the two or more groups of mobile stations will meet 504. If it is determined that the groups are going to meet the transmission parameters of said new radio base station (or stations) are adjusted 508, based on the results of said combined information (the number of mobile stations to be served is the sum of the herds' population).

Preferably, after the herd leaves the area covered by a cell served by the new base station (this is checked by comparing the number of currently served MS with a predefined value) the transmission parameters in this cell are re-adjusted to the reduced traffic, preferably to their original values.

Specific examples of algorithms used in embodiments of the technology disclosed herein are illustrated below.
Determining Location, Velocity and Direction Algorithm

```
//Step One - get location at time t₁
    For each of [x] selected cells (e.g. 3 cells covering a small town)
        Select [y] percent of MS randomly (e.g. 90%)
            Get location information for each MS
```

This operation results in identifying several locations where groups of mobile stations are located. In a preferred embodiment, to save processing power, individual MS not co-located with any of the groups, or small groups with population not exceeding the first threshold T1 are ignored and tracking of only the herds with population exceeding the T1 threshold continues. Alternatively, all individual MS, small or large herds are tracked.

```
//Step Two - derive distance, vector, and average speed at time t₂
    After [t] seconds (e.g. 900 seconds)
        For each of previously chosen MS (from Step One)
            Get current location information for MS and calculate;
                Distance - between current (t₂) and previous (t₁)
                location co-ordinates
                Vector - using resulting line between current (t₂)
                and previous (t₁) location co-ordinates
                Average Speed - using time (t₂ – t₁) and distance
                information
    Restart algorithm
```

Where [x], [y], [t] are arbitrary values that can be set static or dynamic by the service provider.

In a preferred embodiment Level Zero is defined as the finest level of granularity within the telecoms radio network for viewing individual mobile stations. The above local algorithm is the base for 'zooming out' to other levels of granularity. A service provider may define this coarser grained granularity as town (Level One), city (Level Two), province (Level Three), and country (Level Four).

Abstraction Algorithm

---

Select an area of geographical location at level [LEVEL_X] (e.g. Level One)
    Select [v] percent of vectors at [LEVEL_X] – 1 (e.g. Level Zero)
        Combine set of vector data, and accompany resulting vector(s) with
        Density information (i.e. number of MS in vector(s))
        Average speed (i.e. average speed across set of MS)

---

Where [LEVEL_X] can be set as required. In the base level algorithm above, the next level of granularity above the base level (Zero) is a town, which is defined as Level One. Note that in order to select Level Two it must be the case that Level One information has previously been calculated. This is a process that continues as [LEVEL_X] increases. [v] is an arbitrary value that can be set static or dynamic by the service provider.

Dead Reckoning Algorithm

---

For each vector within [dr] percent of vectors at [LEVEL_X] in a selected geographical location
    Use vector data and average speed(s) to provide an ETA to future position(s),
    Include density information (i.e. herd size is the total number of UE's)

---

Where [LEVEL_X] can be set as required and [dr] is an arbitrary value that can be set static or dynamic by the service provider.

Figure 6:
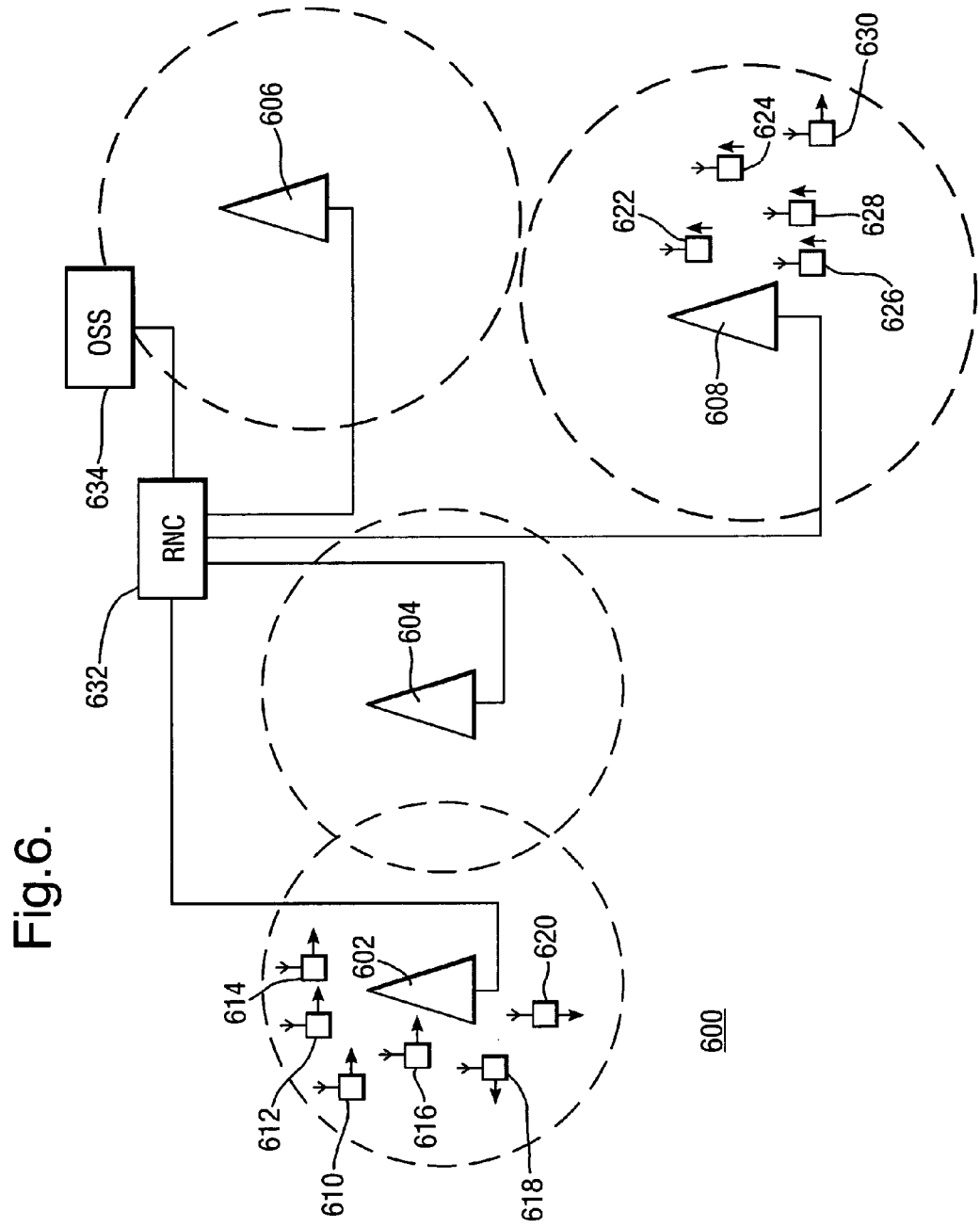
FIG. 6 is a block diagram illustrating a wireless telecommunications network in one embodiment of the technology disclosed herein.

FIG. 6 illustrates a wireless telecommunications network in accordance with one embodiment of the technology disclosed herein. The network 600 comprises a first plurality of radio base stations 602-608, which serve a second plurality of mobile stations 610-630. The network also comprises a radio network controller (RNC) 632, which is responsible for control of the radio base stations (node Bs for 3G networks and eNode Bs for LTE). The RNC 632 is connected to the radio base stations 602-608. In alternative embodiments the network 600 comprises more than one radio network controller. The network 600 further comprises a network management system node 634 (or OSS node, where OSS stands for Operations Support System) adapted to determine position, velocity and direction of travel of the mobile stations 610-630. In a preferred embodiment the network management node 634 obtains the location information from the RNC 632. The network management node calculates the time when the mobile stations 610-616 and 622-628 enter a cell served by a new radio base station 606. From the second plurality of mobile stations 610-630 only mobile stations 610-616 and 622-628 travel in substantially the same direction. The direction of travel is marked by an arrow next to each of the MS in FIG. 6. The node 634 provides this information to the RNC 632 which, in turn, adjusts transmission parameters of said new radio base station 606 (i.e. radio base station serving the cell covering the area the mobile stations will be travelling through or the area where their destination point is located) in order to accommodate the additional traffic. Preferably, the adjustment is carried out in advance of the herd's arrival at a particular area. However, in alternative embodiments some parameters are adjusted before the arrival and some (less critical) after the arrival of the herd or in yet another alternative embodiment all parameters may be adjusted after arrival of the herd if it was not possible in advance of the arrival.

Figure 7:
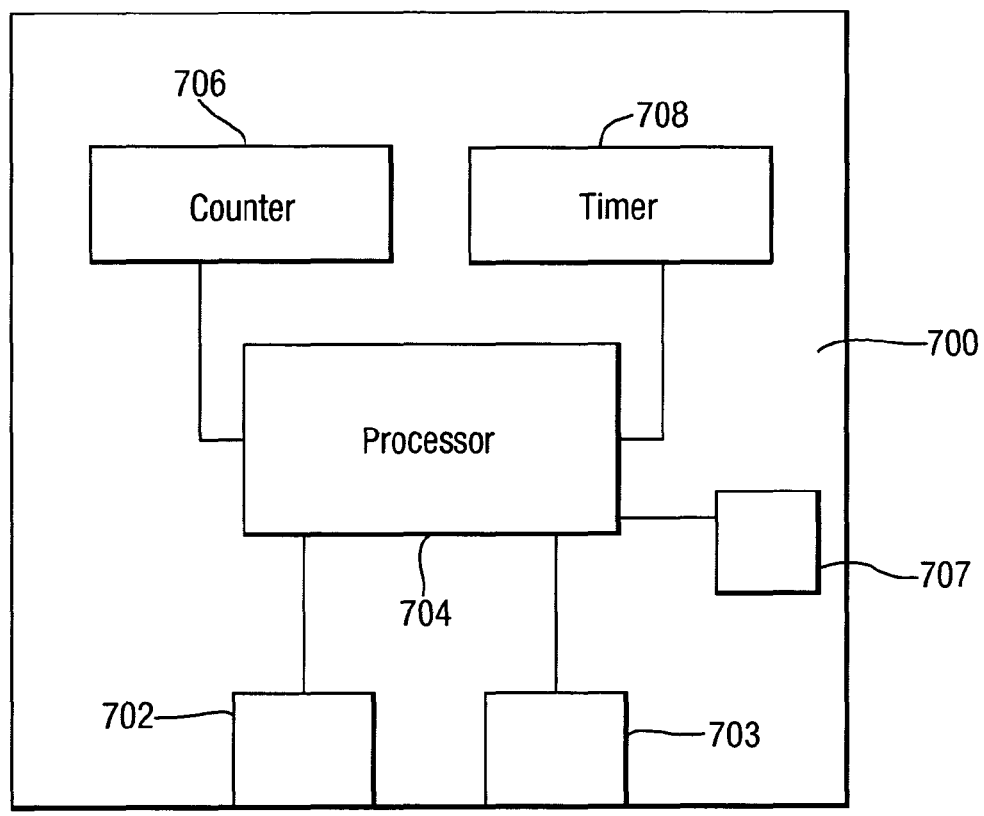
FIG. 7 is a block diagram illustrating a network management system node in one embodiment of the technology disclosed herein.

FIG. 7 presents a network management system node 700 in one embodiment of the technology disclosed herein. The node 700 (or node 634 from FIG. 6) comprises a first interface 702 used for connecting to radio base stations 602-608 of the wireless telecommunications network. Messages between the radio base stations 602-608 and the network management node 700 or 634 are transmitted over Mub interface. Mub is an O&M (operation and maintenance) interface between the radio base stations and network management system node in 3G network. The node 700 also comprises a second interface 703 for connection to a radio network controller 632 and a processor unit 704. The processor unit, depending on embodiment, can be a microprocessor, a set of microprocessors running software loaded from a memory unit 707 or running embedded software. The processor unit 704, operating in accordance with embodiment of the method of the technology disclosed herein, is adapted to determine position, velocity and direction of travel of mobile stations served by said radio base stations and further adapted to calculate time when the mobile station is expected to enter a cell served by a new radio base station. The processor unit 704 carries out these tasks under control of the software, wherein the software includes the algorithms described earlier. The network management system node 700 or 634 provides this information to the radio network controller 632. In alternative embodiment at least part of this information is provided by the network management node to the new radio base station. The processor unit 704 is, preferably, adapted to determine a first number of mobile stations located in a predefined area and to determine the location of said mobile stations, their velocity and direction of travel if the first number exceeds the first threshold. This, as explained in the description of the method, allows for avoiding spending processing resources on tracking groups or individual MS that have no impact on performance of the network in a the cell the MS is going to roam.

In a preferred embodiment the network management node 634, 700 comprises a counter 706 of mobile stations travelling substantially in the same direction. Also preferably the network management node 634 comprises one counter for each identified group of mobile stations. By analysing the directions of travel of the different groups it is possible to predict the area where the groups will meet and the sum of the counters' values gives the expected number of additional mobile stations that the network will have to serve when they arrive at this area.

Also preferably, the processor unit 704 calculates the expected time of arrival if a second number of mobile stations travelling in substantially the same direction exceeds a second threshold T2. If the second number is below T2 then the tracking of this group ceases. Again, the purpose of this feature is to save processing resources and prevent them being used when the traffic will have no real impact on the network. If, however, the second number exceeds the second threshold T2 the processor unit 704 calculates the estimated time of arrival. In a preferred embodiment the counter showing the number of MS travelling in substantially the same direction (herd population) is used. The network management node 700 comprises a timer 708 and each time the timer 708 expires the processor unit 704 checks the value of the counter 706. The process of periodic checking is illustrated in FIG. 4. The timer is started in step 402 and the processor 704 waits 406 until is expires 404. Once the timer expired 404 the counter value is compared with the second threshold T2. If it is below the second threshold the tracking of this herd is stopped 410. If it is above the second threshold the timer 708 is started again.

The node 700 or 634 has information about other herds of MS travelling in the area (whether it is country, county, city, town, and so forth) covered by the network. The processor unit 704 is adapted to combine information about the mobile stations (herds) travelling in substantially the same direction with information about other groups of travelling mobile stations. Using the direction vector the processor unit 704 determines if the two or more groups of mobile stations will meet. The accuracy of this determination increases as the distance to the destination point decreasing.

In the embodiment shown in FIGS. 6 and 7 the network management node 634 and 700 is a standalone node. However, in alternative embodiments this node may be integrated with one or more radio base stations or the radio network controller.

In certain situations, like for example the football match, the number of subscribers is possible to estimate in advance as the football stadium has a very well defined and known capacity, but there are many other events (e.g. music festivals, good weather in a popular coast resort) where the number of mobile stations due to arrive at a specific location is impossible to predict and in this situations the technology disclosed herein plays significant role in managing the telecommunications network. In any case, whether it is or is not possible to estimate the number of MS the technology disclosed herein allows for very precise timing of the changes in the network so that the user experience is good and the power and other resources consumption is optimized.

The invention claimed is:

1. A method of controlling operation of a wireless telecommunications network comprising plural radio base stations serving plural mobile stations, the method comprising:
   determining location and a number of mobile stations in a predefined area and, if the number of said mobile stations exceeds a first threshold, performing acts (1)-(3) as follows:
   (1) monitoring velocity and direction of travel of said mobile stations;
   (2) maintaining a counter of mobile stations in a group of said travelling mobile stations;
   (3) periodically checking the counter and stopping said monitoring if said counter decreases below a second threshold and, if said counter is above the second threshold, performing acts (a)-(b) as follows:
      (a) combining information about the mobile stations travelling as a group in substantially a same direction with information about other groups of travelling mobile stations in order to make a determination if the two or more groups of mobile stations are travelling in respective directions to cause the two or more groups to meet in a cell served by a new radio base station; and
      (b) in accordance with the determination, adjusting transmission parameters of said new radio base station, based on the results of said combination, in order to accommodate the network traffic caused by said groups of mobile stations.

2. The method of claim 1, further comprising calculating time when the mobile stations enter a cell served by a new radio base station.

3. The method according to claim 1, wherein the time of arrival is calculated if a second number of mobile stations travelling in substantially the same direction exceeds a second threshold.

4. The method according to claim 1, further comprising reverting to the original transmission parameters in said new radio base station when the number of mobile stations served by the new radio bases station decreases below a predefined value.

5. The method according to claim 1, wherein the act of adjusting comprises adjusting transmission parameters of at least two new radio base stations to accommodate the network traffic caused by said arriving mobile stations in a set of cells serving the geographical area where the mobile stations arrive.

6. The method according to claim 1, further comprising deploying additional network services to be provided to the mobile stations in the cell served by the new base station.

7. The method according to claim 1, wherein said second threshold is lower than the first threshold.

8. A wireless telecommunications network comprising:
   plural radio base stations serving plural mobile stations;
   at least one radio network controller;
   at least one network management system node;
   wherein the radio network controller is connected to the radio base stations; and
   wherein the network management system node is adapted to determine location and a number of mobile stations in a predefined area and, if the number of said mobile stations exceeds a first threshold, the network management system node is further adapted to:
      monitor velocity and direction of travel of said mobile stations and to provide this information to the radio network controller;
      maintain a counter of mobile stations in a group of said travelling mobile stations,
      periodically check the counter and stop said monitoring if said counter decreases below a second threshold, wherein if said counter is above the second threshold the network management system node is adapted to:
         combine information about the mobile stations travelling as a group in substantially a same direction with information about other groups of travelling mobile stations in order to make a determination if the two or more groups of mobile stations are travelling in respective directions which cause the two or more groups to meet in a cell served by a new radio base station; and
         in accordance with the determination, adjust transmission parameters of said new radio base station, based on the results of said combination received from the network management system node, in order to accommodate the network traffic caused by said groups of mobile stations.

9. The wireless telecommunications network of claim 8, wherein said radio network controller is further adapted to calculate time when the mobile stations enter the cell served by a new radio base station.

10. The wireless telecommunications network according to claim 8, wherein said second threshold is lower than the first threshold.

11. A network management system node for a wireless telecommunications network comprising:
   an interface for connecting to radio base stations of the wireless telecommunications network and to a radio network controller;
   a processor unit adapted to:
   determine location and a number of mobile stations in a predefined area and, if the number of said mobile stations exceeds a first threshold, monitor velocity and direction of travel of mobile stations served by said radio base stations,
maintain a counter of mobile stations in a group of said travelling mobile stations,
to periodically check the counter and stop said monitoring if said counter decreases below a second threshold,
wherein if said counter is above the second threshold the processor unit is adapted to:
combine information about the mobile stations travelling as a group in substantially a same direction with information about other groups of travelling mobile stations in order to make a determination if the two or more groups of mobile stations are travelling in respective directions which cause the two or more groups to meet in a cell served by the new radio base station;
wherein in response to the determination, provide information related to position, velocity, and direction of travel of the mobile stations served by said radio base stations to the radio network controller and/or to said new radio base station.

12. The network management system node of claim 11, wherein said processor unit is further adapted to calculate time when the mobile stations enter a cell served by a new radio base station.

13. The node according to claim 11, wherein processor unit is adapted to calculate the time of arrival if a second number of mobile stations travelling in substantially the same direction exceeds a second threshold.

14. The node according to claim 11, combined with the radio network controller.

15. The node according to claim 11, combined with a radio base station.

16. The node according to claim 11, further comprising a timer and the node being adapted to check periodically, based on the signal from the timer, a value of the counter and to stop tracking the group of mobile stations if the value of the counter decreases below said second threshold.

17. The node according to claim 11, wherein said second threshold is lower than the first threshold.

* * * * *

UNITED STATES PATENT AND TRADEMARK OFFICE
CERTIFICATE OF CORRECTION

| | | |
|---|---|---|
| PATENT NO. | : 8,515,429 B2 | Page 1 of 1 |
| APPLICATION NO. | : 13/054714 | |
| DATED | : August 20, 2013 | |
| INVENTOR(S) | : Quinn | |

It is certified that error appears in the above-identified patent and that said Letters Patent is hereby corrected as shown below:

In the Specification

In Column 5, Line 22, delete "locations" and insert -- locations. --, therefor.

In the Claims

In Column 10, Line 4, in Claim 4, delete "bases" and insert -- base --, therefor.

Signed and Sealed this
Eleventh Day of February, 2014

Michelle K. Lee
*Deputy Director of the United States Patent and Trademark Office*